May 21, 1957
R. D. POMEROY
2,793,096
DE-ODORING OF GAS STREAMS BY THE USE OF
MICRO-BIOLOGICAL GROWTHS
Filed Oct. 5, 1953
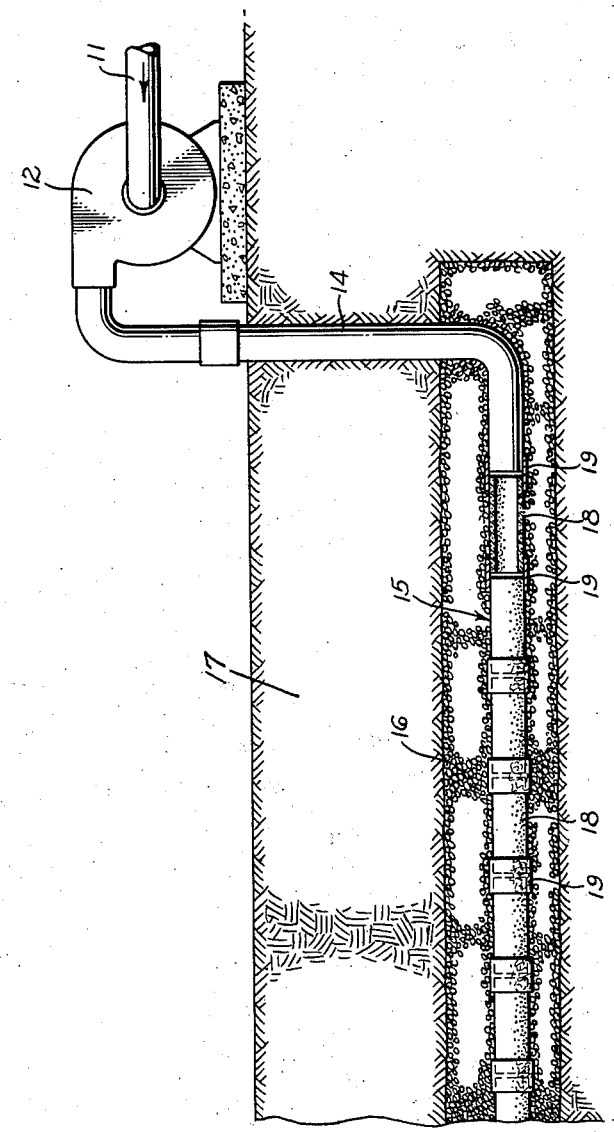
INVENTOR.
RICHARD D. POMEROY
BY HIS ATTORNEYS.
HARRIS, KIECH, FOSTER & HARRIS United States Patent Office 2,793,096
Patented May 21, 1957

2,793,096

DE-ODORING OF GAS STREAMS BY THE USE OF MICRO-BIOLOGICAL GROWTHS

Richard D. Pomeroy, Altadena, Calif.

Application October 5, 1953, Serial No. 384,195

5 Claims. (Cl. 23—2)

The present invention relates to a new and improved process of removing odors from gases. More specifically, it relates to a new and improved process wherein biological growths are used to oxidize malodorous impurities in gas streams.

Prior to the present time a number of devices and processes have been developed to remove malodorous impurities in various types of gases. Perhaps the commonest of these processes involves the use of a highly adsorbent material, such as activated carbon, diatomaceous earth, or the like, to adsorb the objectionable impurity or impurities in a gas. With this type of process, the substituents adsorbed from a gas stream have to be removed from the adsorbent as by leaching or passing an inert gas through the bed of the material, and then subsequently have to be destroyed. Because of their complexity, these adsorbent procedures are limited in their applications to those locations where it is extremely necessary to remove malodorous impurities regardless of cost considerations.

It has been proposed in recent years to remove various gas impurities of the class described by catalytic oxidation of these impurities while passing them over a bed of a catalyst under conditions of elevated temperature and pressure. Obviously, the temperatures, pressures, etc. used with such processes also limit their application to relatively urgent situations. Further, processes of this type for removing malodorous substituents from gases are limited because of the tendency of certain of such substituents to poison any catalyst materials used. At times the oxidation products produced by them are nearly as objectionable as the original odorous materials removed.

There have been proposals in the past to remove the odors from gas streams by the use of biological growths such as are found in common trickling filters. Frequently, such proposals have sought to achieve the dual purpose of removing such odors while at the same time aerating these growths so as to obtain more effective purification of sewage. Because of the fact that all of these proposals have necessitated the use of growths derived from sewage, or growths of a very similar nature, they have not found wide acceptance. The type of biological growth found in a common trickling filter is extremely slimy in nature and occupies a relatively large volume; it by necessity is suspended on rather large pieces of inert material. For example, many trickling filters utilize lumps of around 4″ in diameter of granite or the like as a suspending media. These size considerations also clearly limit the application of this type of process. The quantity of water required is a further limiting factor especially in relatively dry areas.

It is an object of the instant invention to produce a new and improved type of process for removing malodors from gas streams. A further object of the invention is to develop a process of the type described which can be easily and conveniently carried out without the use of extremely expensive equipment. A still further object of the invention is to develop a process for removing malodorous substituents from gas streams which is extremely effective and which can be installed virtually in any location. Further objects of the invention, as well as the advantages of it, will be apparent from the specification, including the accompanying claims.

Briefly, the present invention is predicated upon the discovery that the micro-organisms normally found in any soil are capable of oxidizing the malodorous constituents in gases. The present invention utilizes such biota within their native habitat for this purpose.

Virtually any inorganic or organic odor of natural or artificial origin may be removed with the process of the present invention so long as the compounds comprising these odors do not have properties which are extremely oxidizing or otherwise destructive to microbial life. Such materials as hydrogen sulfide, carbon monoxide, hydrogen cyanide, ammonia, phenol, various mercaptans, and the like, when suspended in a gas can be quite readily oxidized by such organisms. Certain soil biota are even capable of oxidizing hydrocarbon substituents, such as, for example, methane, ethane and the like. Comparatively large quantities of strong oxidizing agents, or strong acids such as chlorine, hydrochloric acid, or the like, are not capable of being removed from gas streams in accordance with the present invention because they tend to destroy all bacteriological life within the soil. Normally, the micro-organisms in the soil are so plentyful that minor proportions of these or similar gases capable of killing or stopping the action of large quantities of the organisms within the soil are not harmful with the use of the instant invention.

Certain gases, such as sulfur dioxide, hydrogen sulfide, and other sulfur-containing gases, will produce sulfuric acid as an end product. Formation of large amounts of this acid would destroy most forms of bacterial life, although the bacteria producing the sulfuric acid will survive in acid concentrations up to 7%, and thus will continue to remove sulfur-containing gases from the gas being purified until the soil solution contains up to 7% of sulfuric acid. If the sulfur-containing gases are present only in small amounts, as for example the concentration of hydrogen sulfide in sewer atmospheres, acid formation will be very slow. Such acid as is formed will be neutralized at least in part by alkaline materials in the soil, such as lime. In the case of a practical installation at Long Beach, California, described in greater detail hereinafter, it was calculated that it would be a matter of years before sulfuric acid formation in soil used to purify air from a sewage pump station could produce an excessive acid concentration. Actually, natural leaching by rainfall, or by irrigation, will never allow a harmful amount to accumulate.

In carrying out the process of the invention, relatively simple apparatus is required. It is preferred to use constructions which in many respects are similar to those employed in the leaching fields of common septic systems. The constructions of the invention utilize a pipe or a series of tiles having a plurality of loose, gas-permeable joints between the adjacent sections as distributing conduits. This pipe is covered by a bed of the various media capable of supporting the micro-organisms used, such as clay, loam, sand, gravel or the like. It is preferred that a comparatively thin layer of a coarse material, such as gravel, cinders, or the like, be placed over the distributing pipe to distribute the gas being treated, and to prevent soil from working down into the distributing pipe. The precise depth at which the distributing pipe used with the invention is buried will vary depending upon the application. In general, depths of from about 2 feet to about 4 feet are satisfactory. In no case should the material surmounting the distributing pipe be impermeable to gas or water. Thus, the present invention is not applicable when impervious clays are used as a soil biota supporting means. However, such clays can be used when they are admixed with sufficient proportions of materials, such as vermiculate, so as to be porous in nature.

One apparatus for carrying out the process of the invention is illustrated in the accompanying drawing.

Here there is shown an inlet pipe 11 for malodorous gases leading to a pump 12 for forcing these gases through a pipe 14 into a distributing conduit 15 from which these gases escape upward through cinders 16 to gas-permeable soil 17 containing oxidizing biota as herein specified. It is to be understood that some of the cinders 16 may carry such biota. The distributing conduit 15 is composed of a series of clay drain tiles 18 laid with their ends about one-half inch apart. These open spaces between the ends of the tiles 18 are covered with loosely wrapped tar paper 19.

The rates of gas flow through the beds of the invention are governed to a substantial extent by the porosity of the soil employed. In general, a minimum of pressure should be used to force the gases being treated through it. The distributing conduits are preferably of sufficient size so as not to exercise a valve or throttling effect with the particular gas flow rates employed. Those skilled in the art will be able to determine the optimum bed size, gas flow rates, distributing conduit diameter, and other factors of a like nature for any given application with a minimum of experimentation. Because of the inexpensive nature of the apparatus of the invention, it is always a good policy to utilize more than the minimum possible bed area, so as to have "reserve" capacity and lower pumping costs than would otherwise be involved.

In practically all instances, sufficient biota to oxidize any impurities to be removed will be present in any soil. When particular odorous substituents, such as gases containing a high proportion of hydrocarbons, are to be purified in accordance with the invention, it may be necessary to add to the soil sufficient organisms capable of oxidizing such wastes so as to commence the purification process. Such organisms for hydrocarbons can be obtained by taking a small quantity of soil adjacent to any petroleum refinery or storage area and using it as an inoculant for the other soil used. For other specific gas substituents, inoculants of a similar category can be found in areas where the soil is frequently exposed to these substituents.

At times it may be desirable to sprinkle the ground immediately above the distributing conduits used with the invention in order to encourage micro-biological growths, although, as a general rule, it is not necessary to do so. Nutrients such as, for example, nitrates or the like, required by organisms which purify sewage, are not required with the invention inasmuch as the organisms utilized for the purpose described thrive almost entirely on the specific gases they oxidize. Thus biota is employed with the invention which is different than the biota employed for such purposes as oxidizing the nitrogen containing wastes from a septic tank or the like.

In order to test the present invention, an experimental column was set up in the laboratory which consisted of a glass tube 2 inches in diameter, filled with moist soil to a depth of 2 feet. A suitable gas distributing manifold was positioned in the bottom of the column. The soil used was obtained from a hillside in Pasadena, California, and consisted largely of clay materials. An extremely odorous stream of air containing iso-valeric acid, skatole and phenol was passed slowly through the column. No odor was detectable in the air emerging from the top of it. Because of the exploratory nature of this test no quantitative measurements were made.

On the basis of it, a full-size installation for removing odors in accordance with the present invention was made at the Belmont Shore sewage pump station in the city of Long Beach, California. This installation consisted of two diffusion trenches, each 3 feet wide, totaling together 60 feet in length. Common drain tile used with septic systems was placed in the bottom of each of the trenches with the joints between the adjacent pieces of tile being protected in a conventional manner with tar paper. Both trenches were then filled to a depth of 6 inches with a layer of common bank gravel having an average particle size of roughly one-half inch. A thin mat of straw just sufficient to completely cover the gravel was then laid within the trench and this, in turn, was covered with a two-foot-deep layer of the soil originally excavated from the trench. The straw served to readily separate the soil and the gravel. Odors from the wet well of the pump station were then pumped within the distributing tiles at a rate of about 730 cubic feet per minute at a back pressure of about 3.50 inches of water. For several days a slight odor was observed on the surface of the ground adjacent the installation. This was believed to be caused by the straw placed between the soil and the gravel as a separating layer. This odor soon disappeared and since that time none of the odors of the wet well of the pump station have been apparent on the ground. It is contemplated that grass will be planted over the installation in due course. Inasmuch as the flow of air through the soil may effect the moistness of it, it may be necessary to water the entire installation as the needs develop depending upon the amount of rainfall within the area.

Those skilled in the art will realize what a number of modifications may be made within the scope of the present invention. Such modifications, insofar as they are within the skill of the art and insofar as they are defined in the appended claims, are to be considered as part of the present inventive concept.

I claim as my invention:

1. A process for treating sewage gases comprising air contaminated by odors arising from sewage for removing therefrom the inorganic and organic odoriferous compounds producing such sewage odors, which process comprises percolating the sewage gases containing such odoriferous compounds upwardly through a gas-permeable soil bed containing micro-organisms normally found in soil, said micro-organisms oxidizing said odoriferous compounds.

2. A process for treating sewage gases comprising air contaminated by odors arising from sewage for removing therefrom the inorganic and organic odoriferous compounds producing such sewage odors, which process includes the steps of: preparing a gas-permeable soil bed using soil containing soil biota normally present therein; and forcing the sewage gases to flow through such soil bed at such rate that said odoriferous compounds are oxidized by the soil biota.

3. A process for removing from air streams organic and inorganic odoriferous compounds of natural or artificial origin, which process includes the steps of: preparing a gas-permeable soil bed using soil containing soil biota normally present therein; pressuring a stream of the odoriferous air and conducting same to a large number of horizontally-spaced discharge points positioned beneath the top surface of said soil bed to discharge at such positions and permeate upwardly through said soil bed to said top surface, the soil biota oxidizing said odoriferous compounds; and controlling the rate of such discharge of odorous air to thrive said soil biota on the odoriferous compounds they oxidize and thus substantially maintain the activity of the soil biota in the absence of other nutrients.

4. A process as defined in claim 3 in which said odorous air stream is a stream resulting from the processing or decay of animal or vegetable materials, and in which said discharge points are spaced about 2–4 feet beneath said top surface of said soil bed.

5. A process as defined in claim 3 in which said gas-permeable soil bed is prepared by digging a trench in the surface of the earth, establishing said discharge points along the bottom of said trench, covering such discharge points with a porous aggregate, and returning to said trench at least a part of the soil originally excavated in forming same, the returned soil containing the same biota as when excavated.

References Cited in the file of this patent

UNITED STATES PATENTS

| | | |
|---|---|---|
| 1,173,534 | Ryan | Feb. 29, 1916 |
| 1,701,825 | Seil | Feb. 12, 1929 |
| 2,285,932 | Leavitt | June 9, 1942 |

FOREIGN PATENTS

| | | |
|---|---|---|
| 2,451 | Great Britain | of 1865 |

OTHER REFERENCES

Moor and Hewlett: "Applied Bacteriology," pages 449–450, 3rd Ed., Williams Wood and Company, New York N. Y., 1906.